(12) United States Patent
Ibenthal et al.

(10) Patent No.: US 7,650,954 B2
(45) Date of Patent: Jan. 26, 2010

(54) METHOD FOR CONTROLLING THE DRIVE POWER DISTRIBUTION IN A MOTOR VEHICLE WITH HYBRID DRIVE

(75) Inventors: Axel Ibenthal, Braunschweig (DE); Thomas Proske, Leiferde (DE); Matthias Schultalbers, Meinersen/ OT Ahnsen (DE); Stefan Spannhake, Vaihingen (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 623 days.

(21) Appl. No.: 11/485,566

(22) Filed: Jul. 12, 2006

(65) Prior Publication Data
US 2007/0012494 A1  Jan. 18, 2007

(30) Foreign Application Priority Data
Jul. 13, 2005  (DE) ................ 10 2005 032 670

(51) Int. Cl.
*B60W 10/06* (2006.01)
(52) U.S. Cl. .............. 180/65.28; 180/65.285; 180/65.265; 701/22
(58) Field of Classification Search .......... 180/65.25, 180/65.265, 65.28, 65.285; 903/915, 926, 903/940, 941, 942; 701/22
See application file for complete search history.

(56) References Cited

U.S. PATENT DOCUMENTS

| | | | |
|---|---|---|---|
| 6,237,563 B1 * | 5/2001 | Froehlich et al. ............. | 123/350 |
| 6,359,404 B1 | 3/2002 | Sugiyama et al. | |
| 6,373,144 B2 | 4/2002 | Fröhlich et al. | |
| 6,430,483 B2 * | 8/2002 | Takaoka et al. ............... | 701/22 |
| 6,483,197 B1 * | 11/2002 | Masberg et al. ........... | 290/40 C |
| 6,602,164 B2 * | 8/2003 | Yoshiaki et al. ............. | 477/107 |
| 6,784,563 B2 * | 8/2004 | Nada ........................ | 290/40 C |
| 6,823,840 B1 * | 11/2004 | Tamai et al. ................ | 123/352 |
| 6,871,129 B2 * | 3/2005 | Kitaori et al. ................ | 701/51 |
| 7,261,670 B2 * | 8/2007 | Endo et al. ..................... | 477/3 |

(Continued)

FOREIGN PATENT DOCUMENTS

DE          197 04 153          8/1998

(Continued)

OTHER PUBLICATIONS

European Search Report dated Oct. 25, 2006 with English translation of the relevant parts.

*Primary Examiner*—Paul N Dickson
*Assistant Examiner*—John D Walters
(74) *Attorney, Agent, or Firm*—Collard & Roe, P.C.

(57) ABSTRACT

A method for controlling the drive power distribution in a motor vehicle with hybrid drive by controlling the drive power distribution of torques of an internal combustion engine and an electric motor on a common drive train of a motor vehicle with hybrid drive. The conversion of a reference moment to an actual moment takes place almost without delay, in the case of a load point shift and/or in the case of a change in the moment desired by the driver. The delay in the conversion of reference moments into actual moments is calculated in advance by means of a control device, and the electric motor is controlled by the control device in such a manner that the torque differences that occur due to the delay of the internal combustion engine are balanced out by the electric motor.

5 Claims, 5 Drawing Sheets

U.S. PATENT DOCUMENTS 7,469,169 B2 * 12/2008 Dreibholz et al. ............. 701/22

FOREIGN PATENT DOCUMENTS

| DE | 101 35 978 | 2/2003 |
| DE | 103 33 931 | 2/2005 |
| DE | 103 37 002 | 3/2005 |
| EP | 0 096 352 | 12/1983 |
| EP | 1 082 231 | 3/2001 |
| WO | WO 2006/069833 | 7/2006 |

* cited by examiner

METHOD FOR CONTROLLING THE DRIVE POWER DISTRIBUTION IN A MOTOR VEHICLE WITH HYBRID DRIVE

BACKGROUND OF THE INVENTION

1. Field of the Invention

The invention relates to a method for controlling the drive power distribution in a motor vehicle with hybrid drive.

2. The Prior Art

Hybrid drives, in which an internal combustion engine and at least one electric motor jointly introduce a torque into the drive train of drive machines, are the known. With hybrid drives in which the torque of the internal combustion engine and of the electric motor are jointly used for drive, a different response capacity exists with respect to the change in the torque of the internal combustion engine and of the electric motor. Due to the effect of internal combustion engines, there is always a delay in the conversion of reference moments to actual moments. This delay is particularly attributable to the behavior of the air mass stream in the suction tube, as well as the behavior of the throttle valve and its adjustment. A change in reference moments to corresponding actual moments is implemented almost without delay by an electric motor. In the division of the torques when there is a load change, the delay that occurs in the internal combustion engine must be taken into consideration, for example in order to avoid choking off the engine by a suddenly increased load moment of the electric motor.

A drive system consisting of an internal combustion engine and at least one electric machine, having a regulation is described in German Patent No. DE 197 04 153 C2, in which the control introduces an increase in the torque of the internal combustion engine when a load is applied while the internal combustion engine is in idle, and controls the electric machine in such a manner, until this internal combustion engine intervention becomes effective, to temporarily provide an additional driving torque.

With this regulation method, the electric motor briefly issues an additional torque to a common drive train, only when there is a load change. Generally, the electric motor is not constantly involved in the drive of the vehicle.

A method for controlling the drive power distribution in a motor vehicle with hybrid drive is described in German Patent No. DE 103 37 002 A1, in which a control device controls and regulates the drive power distribution between the internal combustion engine and the electric machine, with regard to the power dynamics and the energy consumption of the vehicle, as well as its pollutant emission and its driving comfort, on the basis of measured and/or calculated values. If a desire for drive power is signaled, existing reference operation values for the operation of the electric machine are changed to reference operating values adapted to the current desire for drive power. For determining the new reference operating values for the electric machine, its future maximal and minimal moments, powers, degrees of effectiveness, and losses are calculated in advance.

With this method, regulation of the division of the torques when there is a load change, taking into consideration the delay that occurs with the internal combustion engine, does not occur German Patent No. DE 103 33 931 A1 describes a method for regulating an electromechanical, power-branching hybrid drive of a motor vehicle having an internal combustion engine and two electric machines, which are coupled by means of a subsequent gear mechanism. For control, the reference speeds of rotation and the reference torques are calculated for the internal combustion engine and for the two electric machines, in each instance, and the referenced speeds of rotation, in each instance, are compared with the actual speeds of rotation. One or more additional torques are calculated, if there is a deviation in the speeds of rotation, which torques are taken into consideration in the torque control of the internal combustion engine and of the electric motors. In this connection, the speed of rotation regulators of the electric machines are structured as P regulators or PD regulators, and of the internal combustion engine as I regulators, PI regulators, or PID regulators. In this way, the speed of the rotation regulation circuit of the internal combustion engine is provided with an integral part that balances out imprecisions in the torque control of the internal combustion engine.

With this method, only a general balancing out of imprecisions in the torque control of the internal combustion engine takes place. In this case, too, delays occur in a subsequent torque control, by comparing the reference speeds of rotation and actual speeds of rotation, as a basis for the regulation.

SUMMARY OF THE INVENTION

It is therefore an object of the invention to provide a method for controlling the drive power distribution of torques of an internal combustion engine and an electric motor on a common drive train of a motor vehicle with hybrid drive, in which the conversion of a reference moment to an actual moment takes place almost without delay, in the case of a load point shift and/or in the case of a change in the moment desired by the driver.

This object is accomplished, according to the invention, by a method for controlling the drive power distribution in a motor vehicle with hybrid drive, in which the drive power of an internal combustion engine and of at least one electric motor is jointly used to apply a reference moment of the motor vehicle. There is a control that controls and regulates the drive power distribution between the internal combustion engine and the electric motor on the basis of predetermined, measured, and/or calculated values. When the drive power changes due to a load point shift and/or there is a change in the moment requested by the driver, the delay in the conversion of reference moments into actual moments that occurs in the internal combustion engine is calculated in advance by the control device. The control device controls and regulates the electric motor so that the torque differences that occur due to the delay of the internal combustion engine are balanced out by the electric motor.

With a hybrid drive in which the torques of an internal combustion engine and an electric motor are passed to a common drive train, in order to control the drive power distribution when the drive power distribution changes due to a load point shift and/or a change in the moment desired by the driver, the delay in the conversion of reference moments to actual moments that occurs in an internal combustion engine is calculated in advance, by means of a control device. The electric motor is controlled by the control device so that the differences in torque that occur due to the delay of the internal combustion engine are balanced out. Regulation of the balancing of the difference in torques that occurs takes place in the control device, using two identical segment models, to calculate the behavior of an air mass stream in the intake pipe, taking into consideration the throttle valve position, using a moment desired by the driver, and on the basis of a requested load point shift. A predicted torque of the internal combustion engine is determined for the change in the moment desired by the driver, and a predicted amount in torque change of the internal combustion engine is determined for the load point shift, using the segment model in each instance. The predicted torque and the predicted amount of torque change of the internal combustion engine serve as output variables for calculating the reference value of the electric motor to be set during the change in moment, taking into consideration the balancing of the differences in torque that are caused by the internal combustion engine, and with the prerequisite that the minimal and maximal torque limits of the electric motor are not exceeded.

The advantage of the method according to the invention consists in the fact that in the case of a change in the drive power due to a load point shift and/or change in the moment desired by the driver, conversion of a new reference moment into a corresponding actual moment takes place almost without delay. The delays in the conversion of new reference moments into the corresponding actual moments that occur in an internal combustion engine are balanced out by the electric motor, because their progression is calculated in advance in the control device. In this connection, the electric motor is controlled by the control device in such a manner that until the reference moment of the internal combustion engine is reached, the difference in torque caused by the internal combustion engine is balanced out. Using the method according to the invention, it is possible to also carry out a continuous shift of torque power to be applied, between one or more internal combustion engines and one or more electric motors of a hybrid drive.

Another advantage of the invention is that the control adjusts the drive power distribution so that optimal support by the electric motor and optimal utilization of the internal combustion engine takes place. In this way, optimization can also be carried out for the hybrid drive, with regard to minimizing consumption, minimizing emission of pollutants, and improving the driving comfort.

The invention utilizes the electric motor by means of load point shift for charging a battery, since the torque request of the electric motor is also taken into consideration for synchronization.

One embodiment uses two identical segment models of the internal combustion engine for prediction of the torque, taking into consideration the air mass stream in the intake pipe and the throttle valve position, using a moment desired by the driver or on the basis of a requested load point shift. This forms the output variables for calculating the reference value of the electric motor to be set during the change in torque, taking into consideration the balancing of the torque differences that are caused by the internal combustion engine.

The amount of the load point shift in the control device is determined using the load requests and takes into consideration the available minimal and maximal torques of the internal combustion engine and of the electric motor.

The determination of the coordinated request for a load point shift in the control device takes place by means of linking the load requests with the minimal torque of the electric motor and the maximal torque of the internal combustion engine, to produce a minimal value, and by means of linking the load requests with the minimal torque of the internal combustion engine and the maximal torque of the electric motor, to produce a maximal value, as well as by means of linking the determined minimal value with the determined maximal value.

In one embodiment, the current reference moment of the electric motor is determined by linking the moment desired by the driver at the time $t_n$, with the related, predicted torque of the internal combustion engine at the time $t_{n+1}$, calculated in advance, taking into consideration the minimal and maximal torque limits of the electric motor at the time $t_{n+1}$, and/or by linking the predicted amount of the torque change by means of load shift at the time $t_{n+1}$ with the minimal and maximal torque limits of the electric motor at the time $t_{n+1}$.

In another embodiment, the hybrid drive is formed from one or more internal combustion engines and one or more electric motors.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

A hybrid drive for a vehicle, which is actually known, consists of a conventional internal combustion engine and at least one electric motor, which can optionally be operated as a motor or as a generator. The hybrid drive can also be formed from one or more internal combustion engines and one or more electric motors. In this connection, one electric motor is used to apply torques to the common drive train, and the other electric motor is used as a generator to charge an energy storage unit. During motor operation, when using only one internal combustion engine and one electric motor, the electric motor drives a drive train, jointly with the internal combustion engine, and the energy needed to drive the electric motor is provided by an energy storage unit, for example a battery. In generator operation, the electric motor is driven by the internal combustion engine and/or by the push of the vehicle, whereby electrical energy is generated and fed to the energy storage unit. Control of the internal combustion engine and the electric motor takes place by way of a control device, preferably by way of a known engine/motor control device. However, it is also possible that both the internal combustion engine and the electric motor are controlled by separate control devices, and the control of the two drive assemblies are coordinated with one another.

The control of the drive power distribution of the internal combustion engine and the electric motor for applying a common torque to a drive train takes place by way of a control device. When the drive power changes due to a load point shift and/or a change in the moment desired by the driver, the delay in conversion of reference moments into actual moments that occurs in the internal combustion engine is calculated in advance by the control device. On the basis of the delay in conversion of reference moments into actual moments that is calculated in advance, and the difference in moments that occurs in this connection, the electric motor, which responds almost without delay, is controlled and regulated by the control device, taking into consideration adherence to the minimal and maximal torque limit of the electric motor, in such a manner that the differences in torques that occur due to the delay of the internal combustion engine are balanced out by the electric motor.

Figure 1:
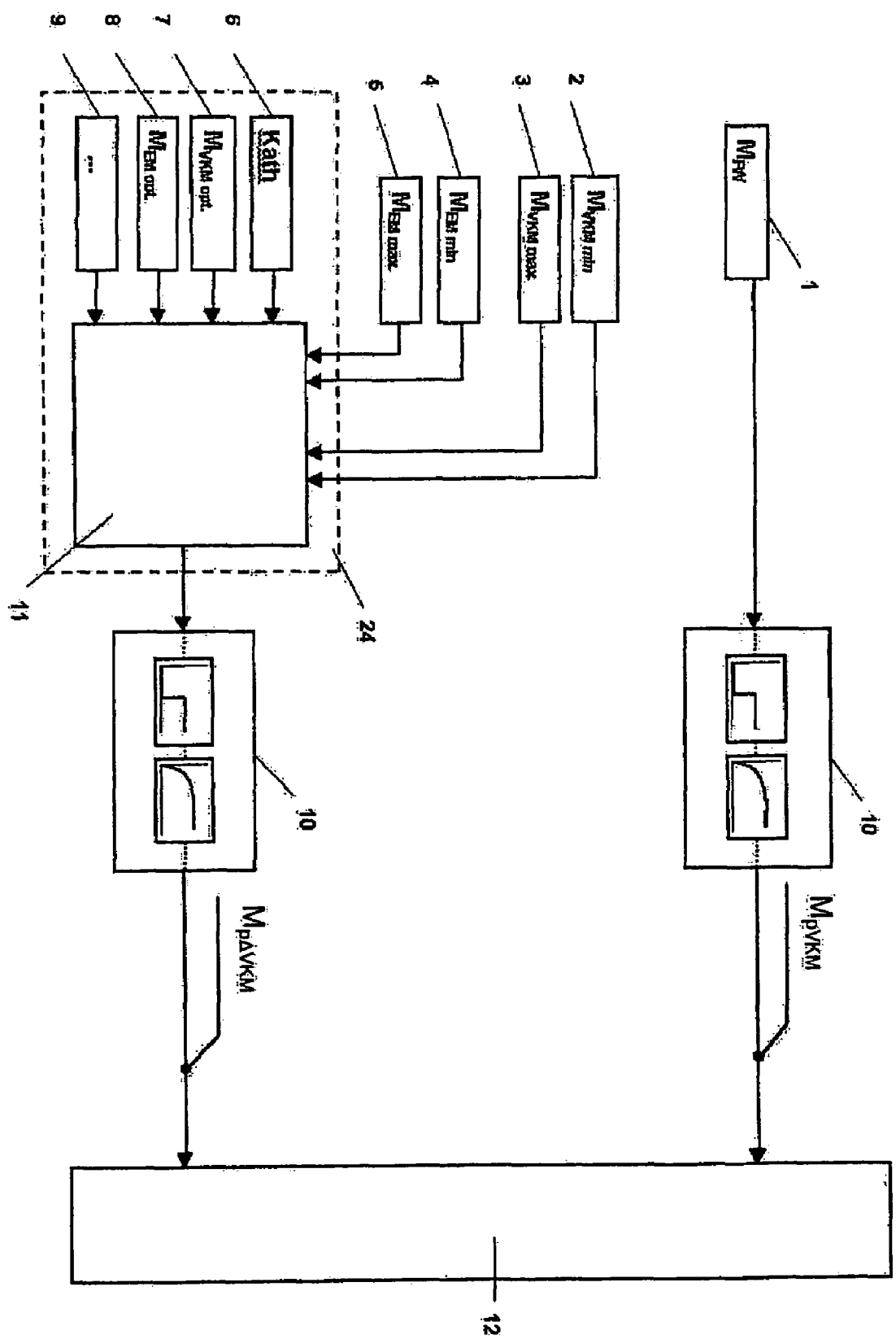
FIG. 1 shows a schematic representation of the control of the drive power distribution of a hybrid drive, according to the invention.

FIG. 1 shows a schematic representation of the control of the drive power distribution of a hybrid drive, according to the invention. In the control unit, the torque of the internal combustion engine is predicted using two identical segment models 10, taking into consideration the air mass stream in the intake pipe, with different input variables, in each instance. One segment model 10 is provided with the moment desired by the driver $M_{FW}$ 1 as the input variable, and the other segment model 10 is provided with a requested load point shift 24. By linking of the predicted torque of the internal combustion engine that results from moment 1 desired by the driver with the predicted amount of the change in torque of the internal combustion engine that results from load shift 24, which linking will be explained in greater detail below, the torque reference moment calculation 12 for the electric motor takes place on the basis of the delayed conversion of the reference moments into actual moments of the internal combustion engine.

In the coordination of the moment request for load point shift that is shown in the block schematic 11 of FIG. 1, the following vehicle-specific data are linked with one another:

the minimal torque of the internal combustion engine $M_{VKM}{}^{min}$ 2
the maximal torque of the internal combustion engine $M_{VKM}{}^{max}$ 3
the minimal torque of the electric motor $M_{EM}{}^{min}$ 4
the maximal torque of the electric motor $M_{EM}{}^{max}$ 5
the catalytic converter heating information $Kat_h$ 6
the optimal torque of the internal combustion engine 7
the optimal torque of the electric motor 8, and
other moment requests 9, such as charging of the battery by means of the electric motor in generator operation, for example, or other moment requests that result from operation of the vehicle.

Figure 2:
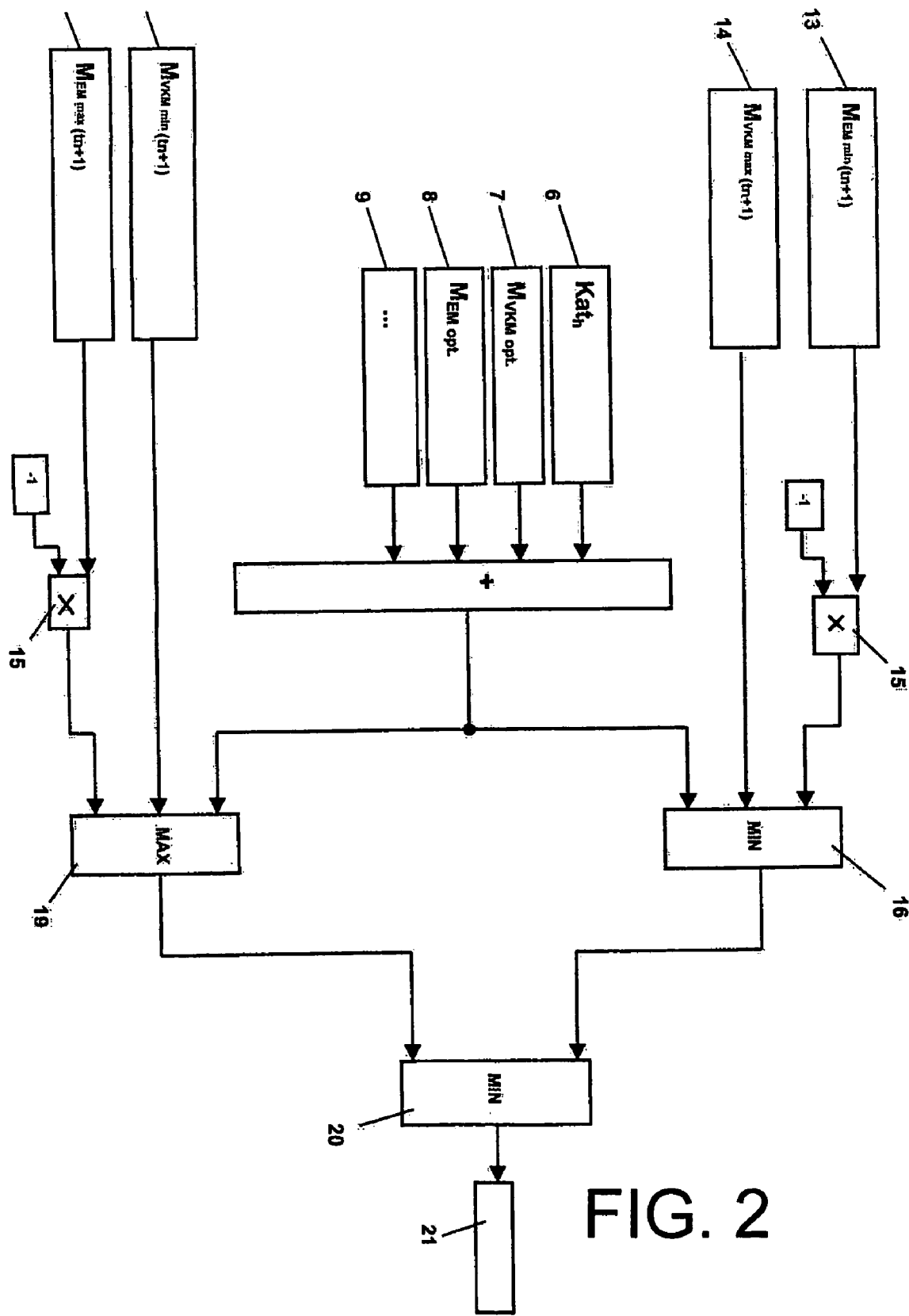
FIG. 2 shows a schematic representation of the coordination of the load point shift, in connection with the control of the drive power distribution.

FIG. 2 shows the structure of the block schematic 24 shown in FIG. 1 for load point shift. In this connection, a minimal torque difference of the electric motor that can be applied in the case of a load point shift is determined from the minimal torque of the electric motor 13 $M_{EM}{}^{min}$ at the time $t_{n+1}$, and taking into consideration a linking element 15, with which a reversal of sign takes place, and the maximal torque of the internal combustion engine 14 $M_{VKM}{}^{max}$ at the time $t_{n+1}$, as well as the moment requests for load point shift 6, 7, 8, and 9 in the linking element 16. In linking element 19, a maximal torque difference of the electric motor that can be applied in the case of a load point shift is determined from the minimal torque of the internal combustion engine 17 $M_{VKM}$ min at the time $t_{n+1}$ and from the maximal torque of the electric motor 18 $M_{EM}$ max at the time $t_{n+1}$, taking into consideration the linking element 15, as well as from the moment requests for load point shift 6, 7, 8, and 9. The coordinated request for load point shift 21 is calculated in the control device by linking the values determined in the linking elements 16 and 19 in the linking element 20. Using the coordinated request for load point shift, the amount of torque change for calculating the behavior of internal combustion engine 23 is determined by the segment model, by prediction as shown in FIG. 1.

Figure 3:
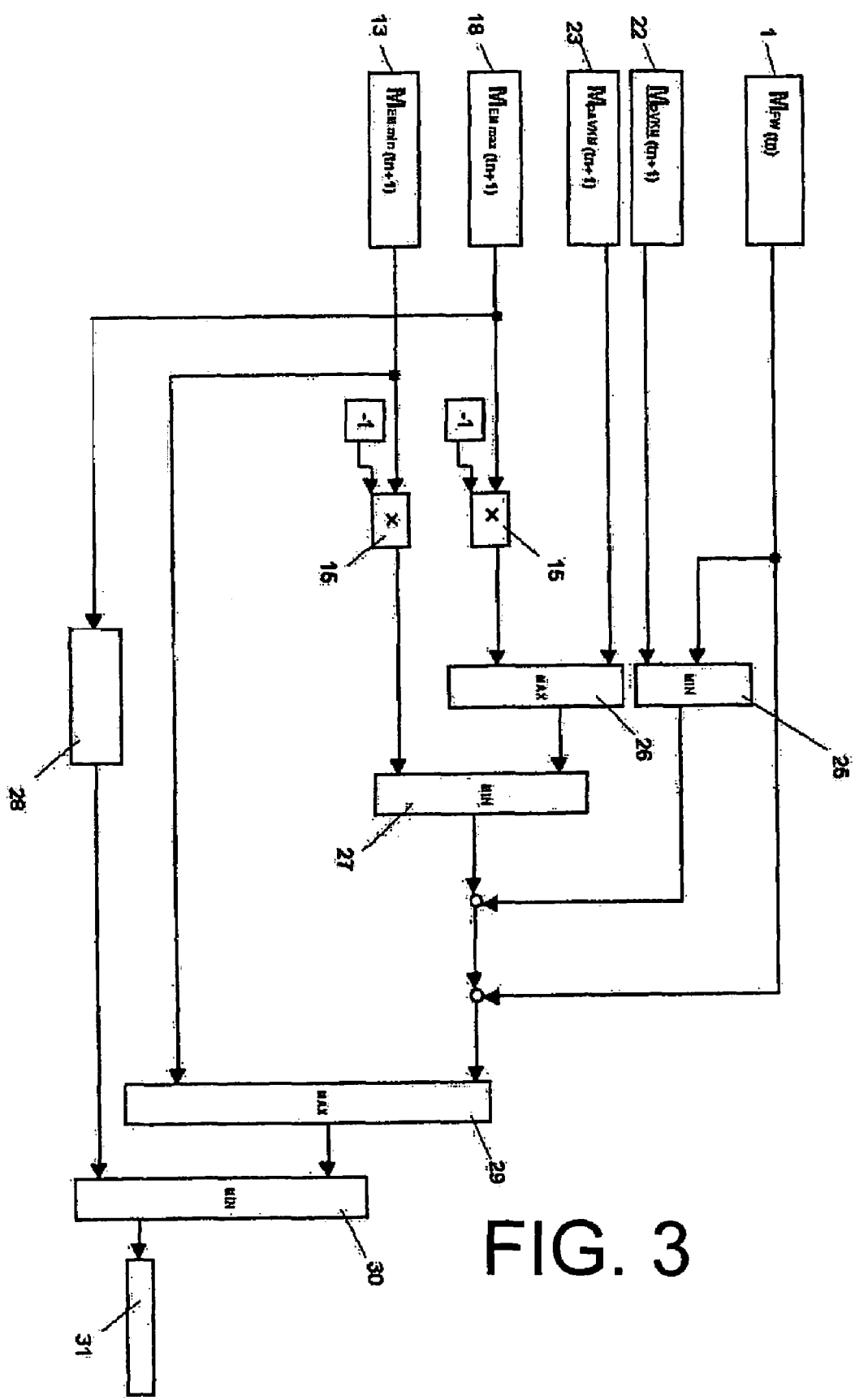
FIG. 3 shows a schematic representation of the calculation of the reference moment for an electric motor, in connection with the control of the drive power distribution.

The calculation of torque reference value for electric motor 12, shown in FIG. 1, as the result of the load point shift and/or a change in moment desired by the driver, is shown in detail in FIG. 3. Linking of moment 1 desired by the driver at the time $t_n$ with the torque of the internal combustion engine 22 $M_{pVKM}$ at the time $t_{n+1}$, predicted using the segment model, takes place in the linking element 25. Linking of the predicted amount of the torque change of internal combustion engine 23, as described above, with the maximal torque of internal combustion engine 18 $M_{VKM}{}^{max}$ at the time $t_{n+1}$, taking into consideration the linking element 15, takes place in linking element 26. The value determined in this manner is linked with the minimal torque of electric motor 13 $M_{EM}{}^{min}$ at the time $t_{n+1}$ and taking into consideration another linking element 15, in the linking element 27.

The value from linking element 27 is linked with the minimal torque of electric motor 13 $M_{EM}{}^{min}$ at time $t_{n+1}$, taking into consideration moment 1 desired by the driver at time $t_n$, and the value determined from block 25, in linking element 29. By linking this value with the maximal torque of the internal combustion engine 18 $M_{VKM}$ max at time $t_{n+1}$, taking into consideration the check of reproducibility 28 of the implementation of the torque change, in linking element 30, the current reference moment of the electric motor is calculated in the case of a conversion from reference moments to actual moments, with which the torque difference that occurs due to the delay of the internal combustion engine is also balanced out. With the structure described, a continuous shift of torques between the internal combustion engine and the electric motor can take place. This torque shift finds use both in the conversion of reference moments to actual moments and for utilization of the special advantages of a hybrid drive, such as minimizing fuel consumption and exhaust gas emissions, for example.

Figure 4:
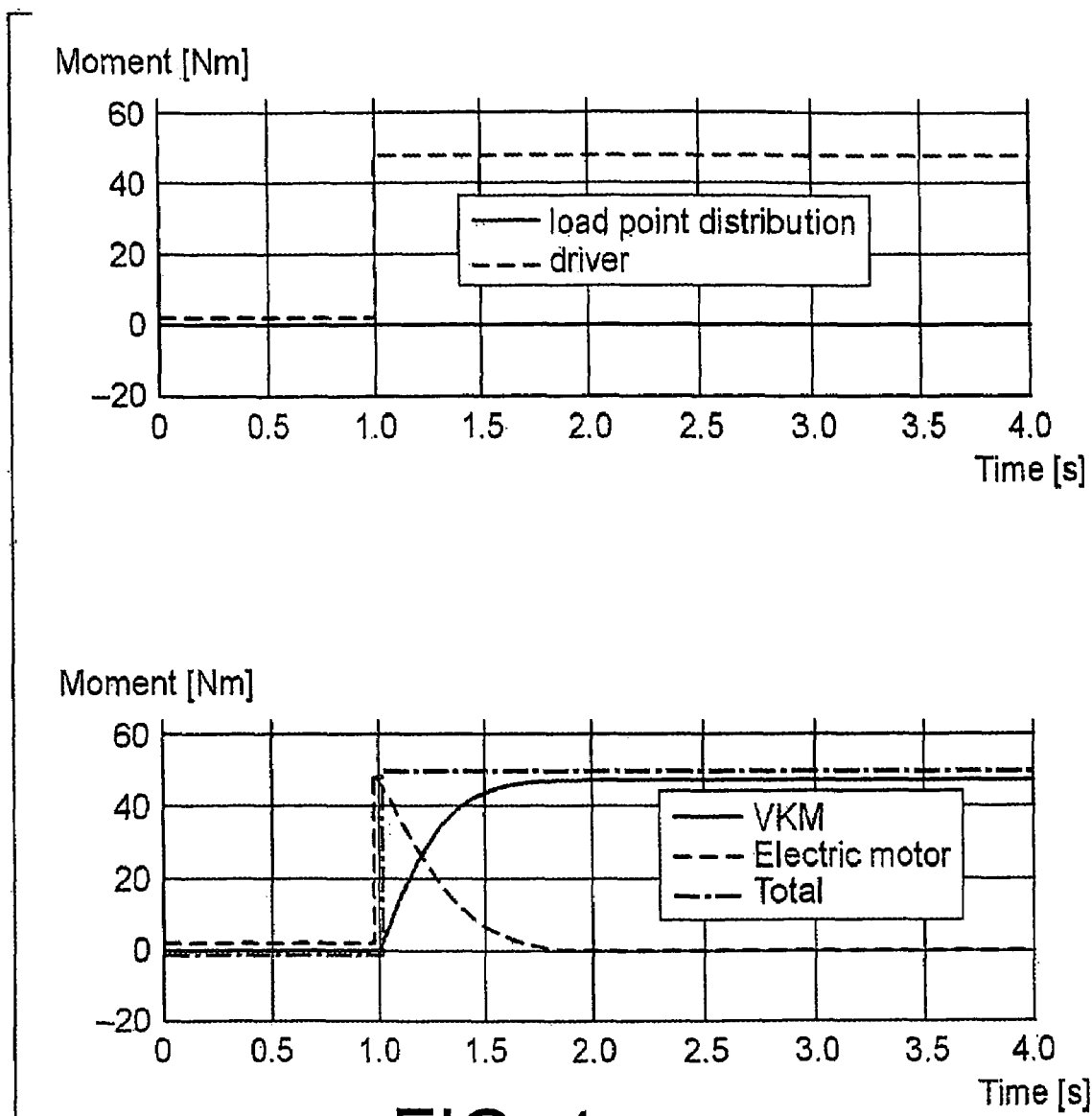
FIG. 4 shows a schematic representation of the torque progression during a jump in the moment desired by the driver.
Figure 5:
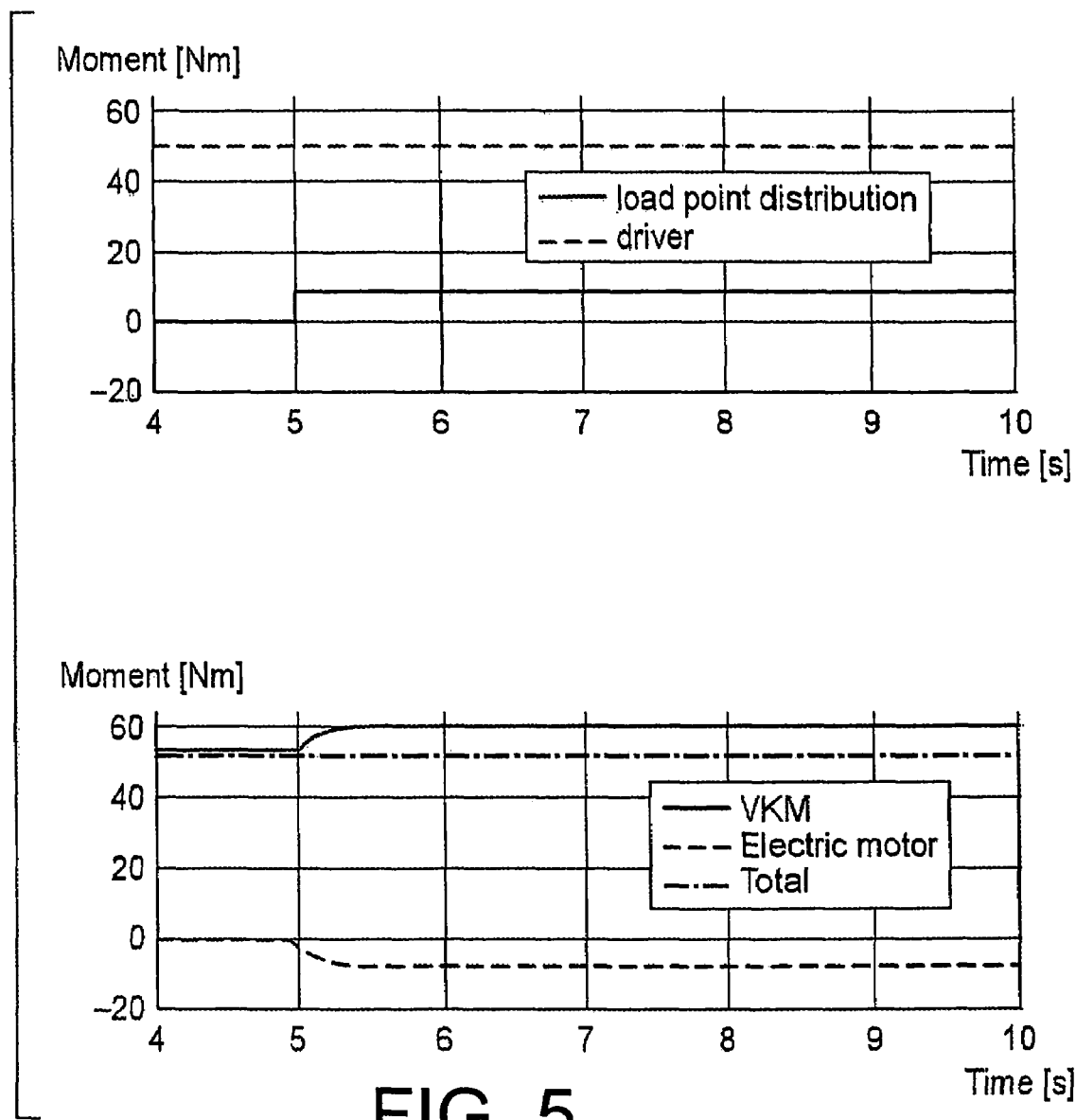
FIG. 5 shows a schematic representation of the torque progression during a load point shift.

FIGS. 4 and 5 show the shift of the torques between internal combustion engine and electric motor, in the case of change in the moment desired by the driver, and in the case of a load point shift. In the upper diagram of FIG. 4, a change in the moment desired by the driver is shown as a broken line, and a load point shift is shown as a solid line. From this, it is evident that over the period of time being considered, no load point shift takes place, but that an increased torque is requested by the driver at the time t=1. In the lower diagram of FIG. 4, the related torques are plotted for a change in the moment desired by the driver. The torque of the internal combustion engine that results in this connection is shown as a solid line, that of the electric motor as a broken line, and the total moment that results from this is shown as a dot-dash line. From the representation, it is evident that in the conversion of the reference moments into actual moments, the behavior of the internal combustion engine is balanced out by the almost delay-free conversion of reference moments into actual moments by the electric motor.

In FIG. 5, which shows the time progression of the torques with a request for a load point shift, the line identification corresponds to that of FIG. 4. A load shift can be derived from the upper diagram, in which the control device requests an additional torque of 10 Nm, for example, so that the electric motor goes over into generator operation and therefore can charge the battery. Since the driver request does not change, it must be assured that the torque at the drive train remains constant. The proposed control takes the delay time of the internal combustion engine into consideration, and changes the torque of the electric motor not in a sudden manner, but rather in accordance with the available torque of the internal combustion engine.

Accordingly, while only a few embodiments of the present invention have been shown and described, it is obvious that many changes and modifications may be made thereunto without departing from the spirit and scope of the invention.

LIST OF REFERENCE NUMERALS 1 moment desired by the driver $M_{FW}$
2 minimal torque of the internal combustion engine $M_{VKM}{}^{min}$
3 maximal torque of the internal combustion engine $M_{VKM}{}^{max}$
4 minimal torque of the electric motor $M_{EM}{}^{min}$
5 maximal torque of the electric motor $M_{EM}{}^{max}$
6 catalytic converter heating data Kath
7 optimal torque of the internal combustion engine
8 optimal torque of the electric motor
9 other moment requests
10 segment model for advance calculation of the behavior of an internal combustion engine, taking into consideration the air mass stream in the intake pipe
11 block schematic for coordination of the moment request for load point shift
12 torque reference value calculation for the electric motor
13 minimal torque of the electric motor MEM min at the time $t_{n+1}$
14 maximal torque of the internal combustion engine $M_{VKM}{}^{max}$ at the time $t_{n+1}$
15 linking element
16 linking element
17 minimal torque of the internal combustion engine $M_{VKM}{}^{min}$ at the time $t_{n+1}$
18 maximal torque of the electric motor $M_{EM}{}^{max}$ at the time $t_{n+1}$
19 linking element
20 linking element
21 coordinated request for load point shift
22 predicted torque of the internal combustion engine $M_{pVKM}$ at the time $t_{n+1}$
23 predicted torque change of the internal combustion engine $M_{pDVKM}$ at the time $t_{n+}$
24 block schematic for load point shift
25 linking element
26 linking element
27 linking element
28 check of reproducibility
29 linking element
30 linking element
31 determination of the current reference moment of the electric motor

What is claimed is:

1. A method for controlling the drive power distribution in a motor vehicle with hybrid drive, comprising the following steps:

applying a reference moment of the motor vehicle from the drive power of an internal combustion engine and of at least one electric motor in the motor vehicle;

calculating in advance via a control device a delay in a conversion of reference moments to actual moments in the internal combustion engine when the drive power changes due to a load point shift or change in the moment requested by the driver, wherein said step of calculating uses two identical segment models of the internal combustion engine for prediction of torque, said models taking into consideration an air mass stream in an intake pipe of the engine and a throttle valve position of the engine, and said models using a moment desired by the driver or on the basis of a requested load point shift to form output variables for calculation of the reference value of the electric motor to be set during the change in torque, and taking into consideration the balancing of torque differences that are caused by the internal combustion engine; and controlling and regulating the drive power distribution between the internal combustion engine and the electric motor by the control device based on said step of calculating so that torque differences that occur due to the delay of the internal combustion engine are balanced out by the electric motor.

2. A method according to claim 1, wherein the load point shift is determined using load requests and takes into consideration available minimal and maximal torques of the internal combustion engine and of the electric motor.

3. A method according to claim 2, wherein the load point shift is determined by linking the load requests with the minimal torque of the electric motor and the maximal torque of the internal combustion engine, to produce a minimal value, and by linking the load requests with the minimal torque of the internal combustion engine and the maximal torque of the electric motor, to produce a maximal value, as well as by means of linking the determined minimal value with the determined maximal value.

4. A method according to claim 1, wherein the reference moment of the electric motor to be applied is determined by linking the moment desired by the driver at a time $t_n$ with a related, predicted torque of the internal combustion engine at time $t_{n+1}$, calculated in advance, taking into consideration minimal and maximal torque limits of the electric motor at the time $t_{n+1}$, or by linking the predicted amount of torque change by load shift at the time $t_{n+1}$ with the minimal and maximal torque limits of the electric motor at the time $t_{n+1}$.

5. A method according to claim 1, wherein the hybrid drive is formed from one or more internal combustion engines and one or more electric motors.

* * * * *

UNITED STATES PATENT AND TRADEMARK OFFICE
CERTIFICATE OF CORRECTION

PATENT NO. : 7,650,954 B2
APPLICATION NO. : 11/485566
DATED : January 26, 2010
INVENTOR(S) : Ibenthal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-third Day of November, 2010

David J. Kappos
*Director of the United States Patent and Trademark Office*